United States Patent
Stündl

(10) Patent No.: US 6,311,560 B1
(45) Date of Patent: Nov. 6, 2001

(54) SEPARATING MEMBRANE SYSTEMS FOR A PRESSURE TRANSDUCER, WITH A WAVE CREST EDGE AND A PRE-AND POST-CUT MEMBRANE

(75) Inventor: Matthias Stündl, Potsdam (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/486,431
(22) PCT Filed: Aug. 24, 1998
(86) PCT No.: PCT/DE98/02481
  § 371 Date: May 25, 2000
  § 102(e) Date: May 25, 2000
(87) PCT Pub. No.: WO99/12013
  PCT Pub. Date: Mar. 11, 1999

(30) Foreign Application Priority Data

Aug. 29, 1997 (DE) .............................................. 197 38 704

(51) Int. Cl.$^7$ ........................................................ G01L 7/00
(52) U.S. Cl. ................................................................. 73/706
(58) Field of Search .............................. 73/706, 708, 715, 73/716, 717, 718, 719, 720, 721, 722, 723, 724, 725, 726, 727, 728, 729; 29/621.2, 25.41, 25.35; 361/283.1–283.4

(56) References Cited

U.S. PATENT DOCUMENTS 3,566,750  3/1971  Allen .
4,072,058  2/1978  Whitehead, Jr. .
4,199,991  4/1980  Kodama .
5,029,478  7/1991  Wamstad .................................. 73/706

FOREIGN PATENT DOCUMENTS 297 04 321  6/1997  (DE) .

OTHER PUBLICATIONS

Drawing, STD 915, Honeywell (No date).

*Primary Examiner*—William Oen
(74) *Attorney, Agent, or Firm*—BakerBotts LLP

(57) ABSTRACT

A method for the production of a separating diaphragm system as well as a separating diaphragm system for a pressure transducer is described. The system includes an inner body having a structured area with annular, wave crest-like elevations and wave trough-like depressions, with a separating diaphragm which is fixedly joined on the outside to the inner body via an annular connection point and with an outer pressure cap which is pressed against the separating diaphragm with interposition of a sealing ring.

In order to be able to produce pressure transducers that have consistent measuring characteristics even with pressure changes, an inner body is used which is limited to the outside by a wave crest-like elevation; the pre-molded separating diaphragm is joined to the inner body with its collar so that it rests outside on the outer wave crest-like elevation, following which post-molding of the separating diaphragm is carried out and the pressure cap with the sealing ring is then attached.

9 Claims, 1 Drawing Sheet

SEPARATING MEMBRANE SYSTEMS FOR A PRESSURE TRANSDUCER, WITH A WAVE CREST EDGE AND A PRE-AND POST-CUT MEMBRANE

FIELD OF THE INVENTION

The present invention relates to a method for the production of a separating diaphragm system as well as a separating diaphragm system for a pressure transducer with an inner body having a structured area on its outer surface with annular, wave crest-like elevations and annular, wave trough-like depressions, with a separating diaphragm having a collar formed by pre-molding in the area of its outer circumference. The separating diaphragm is fixedly joined to the inner body so as to be gas-tight via an annular connection point on the collar and being correspondingly corrugated by post-molding the outer surface of the inner body, and with an outer pressure cap which is pressed against the separating diaphragm with interposition of a sealing ring.

BACKGROUND INFORMATION

A pressure and/or pressure difference transducer STD 915 from Honeywell is produced according to a method of this type. In the production of this conventional transducer, the separating diaphragm is pre-molded in such a way that it has a pot-like shape with a wide edge. At the inner area of the edge, the separating diaphragm is welded to an inner body of the transducer in an annular shape. Outside the annular weld seam, a sealing ring is provided in the conventional transducer, which lies in an annular groove of a pressure cap and is pressed with the pressure cap against the separating diaphragm on the inner body. Previously, in the production of the conventional transducer, the separating diaphragm was post-molded by pressing it against a structured area of the surface with wave-like elevations and depressions.

An object of the present invention is to provide a method for the production of a separating diaphragm system for a pressure transducer by which a pressure transducer with very good measuring characteristics can be produced.

According to the present invention, an inner body is used, the structured area of which is limited to the outside by an outer wave crest-like elevation. The collar of the pre-molded separating diaphragm is joined on the outside to the outer wave crest-like elevation adjacent to the inner body, following which post-molding of the separating diaphragm is carried out and the pressure cap with the sealing ring is then attached.

An advantage of the method according to the present invention is that a pressure transducer—and of course, a pressure difference transducer as well—can be produced with it, the separating diaphragm being pressed onto the outer flank of the outer wave-like elevation and its "crest" due to the attachment of the collar of the pre-molded separating diaphragm to the outside of the outer wave-like elevation and due to the subsequent post-molding via the initial radial tensile stress which arises and remains in the separating diaphragm. As a result, the fixation diameter of the separating diaphragm is precisely defined and hardly changes even with pressure fluctuations. Accordingly, the volume stiffness of the separating diaphragm stays nearly constant even with changes in pressure.

In one example embodiment of the method according to the present invention, the collar on the outer flank of the outer wave-like elevation is joined to the inner body. In this manner, it is possible to obtain a pressure transducer having a relatively compact structure.

Moreover, in order to obtain a pressure transducer with a precisely defined fixation diameter of its separating diaphragm, it may be advantageous if the collar is joined to the inner body in an area of the elongated flank of the outer wave-like elevation lying below the level of the wave-like depressions.

In a further example embodiment of the method according to the present invention, the separating diaphragm is pre-molded in such a way that on its outer edge it has a flat annular area adjoining the collar. The flat annular area of the separating diaphragm is joined to a flat edge of the inner body.

If a pressure transducer is to be produced for corrosive media, the sealing ring is arranged so as to cover the connection point between the separating diaphragm and the inner body.

An additional object of the present invention is to provide a separating diaphragm system for a pressure transducer which provides the pressure transducer with very good measuring characteristics.

In order to achieve this object, in a separating diaphragm system for a pressure transducer with an inner body having a structured area on its outer surface with annular, wave crest-like elevations and annular, wave trough-like depressions, with a separating diaphragm having a collar formed by premolding in the area of its outer circumference. The separating diaphragm is fixedly joined to the inner body so as to be gas-tight via an annular connection point on the collar and is correspondingly corrugated by post-molding the outer surface of the inner body. An outer pressure cap is pressed against the separating diaphragm with interposition of a sealing ring. According to the present invention the structured area of the inner body is limited to the outside by an outer wave crest-like elevation and the collar of the separating diaphragm is joined to the outside of the outer wave crest-like elevation adjacent to the inner body.

A separating diaphragm system is described in U.S. Pat. No. 4,199,991 in which an inner body of a pressure transducer has in the vicinity of its edge on its outer surface a structured area with an annular wave crest-like elevation and an annular wave-like depression and a separating diaphragm is attached to the edge of the outer surface of the inner body via an annular welding seam. The separating diaphragm is corrugated corresponding to the outer surface of the inner body. A pressure cap is pressed against the separating diaphragm, the pressure cap accommodating a sealing ring at the edge of an inner recessed area. However, the conventional separating diaphragm system does not have a pre-molded collar. Also, the structured area of the inner body is limited to the outside by a wave trough-like depression. The conventional separating diaphragm system prevents corrosive media that may be present in the pressure cap from attacking the inner body. The inner body is in fact completely sealed off from the medium in the pressure chamber by the separating diaphragm and the sealing ring. Therefore, it is not necessary to use material resistant to corrosive media for the inner body, which provides a cost benefit in manufacturing and moreover does not pose any significant problems in welding the separating diaphragm to the inner body.

Another advantage of the separating diaphragm according to the present invention is that as a result of its design, the fixation diameter of the separating diaphragm is defined relatively precisely and does not vary even with pressure fluctuations within a pressure transducer. If, for example, the pressure cap expands due to a change in pressure, the fixation diameter of the separating diaphragm in the separating diaphragm device according to the present invention is not influenced to any great extent because it is fixed by the "crest" of the outer wave crest-like elevation. This may be important because the fixation diameter of a separating diaphragm has a very great influence on the spring properties of the separating diaphragm and accordingly on the measuring characteristics of a pressure transducer. Thus, the separating diaphragm system according to the invention does not disadvantageously change the measuring characteristics.

In the separating diaphragm system according to the present invention, the connection point between the separating diaphragm and the inner body is located outside and below the outer wave crest-like elevation and below the "crest" of this elevation. This can be achieved in that the outer flank of the outer wave crest-like elevation is elongated to below the level of the wave trough-like depressions and the connection point between the separating diaphragm and the inner body is located in the elongated area of the outer flank. In this case, even severe expansions of the pressure cap caused by high pressure changes do not bring about a noticeable change in the fixation diameter of the separating diaphragm.

In an additional example embodiment of the separating diaphragm system according to the present invention, the separating diaphragm has at its outer edge a flat annular area adjoining the collar, the flat annular area of the separating diaphragm being joined to a flat edge of the inner body.

In order to prevent corrosive media in the pressure chamber from possibly gaining access to the connection point, in an advantageous manner in the separating diaphragm system according to the present invention, the sealing ring is arranged so as to cover the connection point.

DETAILED DESCRIPTION

Figure 1:
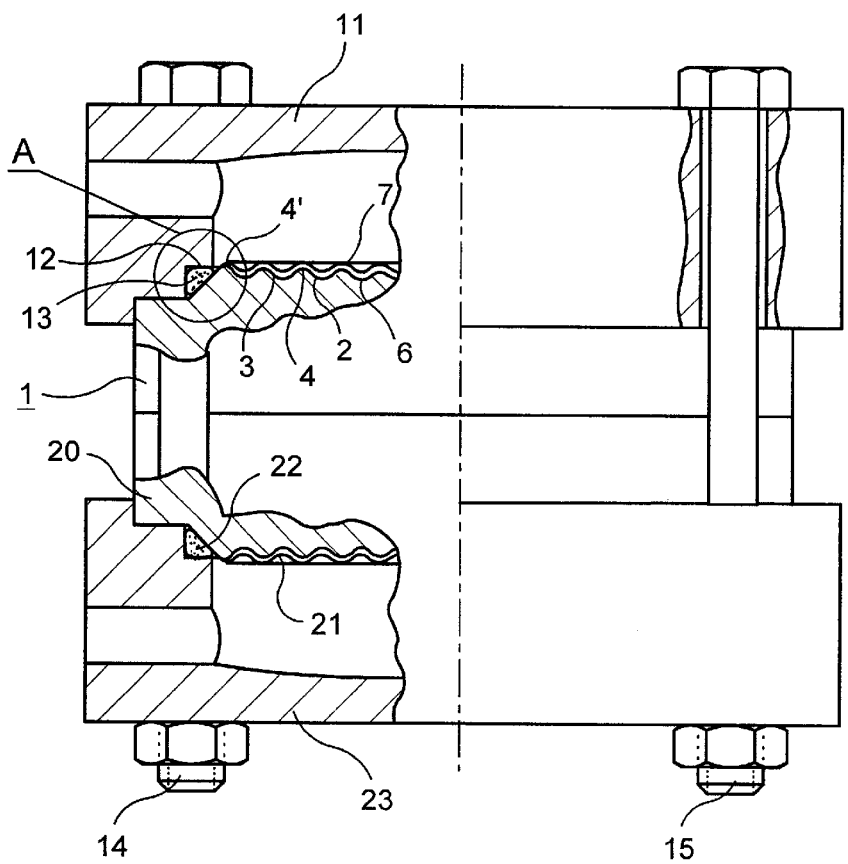
FIG. 1 shows a partial section and a partial side view of a transducer designed as a pressure difference transducer with an exemplary embodiment of the separating diaphragm system according to the present invention.

As shown in from FIG. 1, an inner body 1 of the transducer shown is provided with a structured area 3 at its outer surface 2. This structured area 3 has annular, wave crest-like elevations 4 and is limited to the outside by an outer wave crest-like elevation 4'. In addition, several wave trough-like, annular depressions 6 of structured area 3 can be recognized in FIG. 1.

Figure 2:
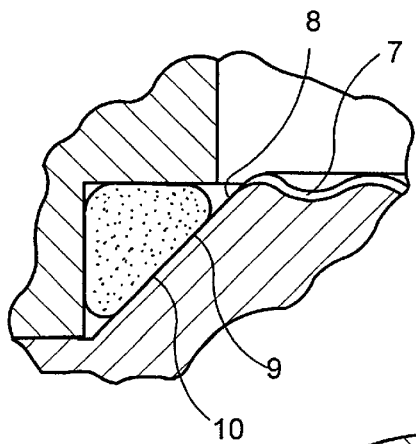
FIG. 2 shows a detail of the exemplary embodiment according to FIG. 1.

At its outer surface 2, inner body 1 is provided with a separating diaphragm 7 (see also FIG. 2 which shows detail A of FIG. 1). Separating diaphragm 7 is pre-molded before being joined to inner body 1 specifically in such a way that it obtains a collar 8 that points downwards in each of the figures. In this connection, separating diaphragm 7 is molded in such a way that its collar 8 can be placed against outer flank 9 of outer annular, wave crest-like elevation 4'. Flank 9 extends far below the level of wave trough-like depressions 6 and is fixedly joined to inner body 1 via a connection point 10 which is a glue joint in the embodiment according to FIGS. 1 and 2.

A pressure is subsequently exerted on the diaphragm arrangement produced in this manner in such a way that separating diaphragm 7 is pressed against structured area 3 of inner body 1 and post-molded in so doing. This brings about permanent radial initial tensile stresses in separating diaphragm 7 via which it is ensured that when the pressure transducer is used, the separating diaphragm is always precisely in contact with the outer wave crest-like elevation and/or its crest even with pressure fluctuations, with the result that a specified fixation diameter is always maintained.

A pressure cap 11 is placed on the thus finished separating diaphragm system, the pressure cap accommodating a sealing ring 13 in an annular recess 12. Pressure cap 11 is fixedly clamped to inner body 1 in the conventional manner via clamping bolts 14 and 15 via which sealing ring 13 is tightly pressed against separating diaphragm 7 in the area of annular contact point 10.

The embodiment according to FIG. 1 is a pressure difference transducer, the overall structure of which is obtained by reflecting the above-described configuration at an imagined horizontal center line. Thus an additional inner body 20 having an additional separating diaphragm 21, an additional sealing ring 22 and an additional pressure cap 23 is present.

Figure 3:
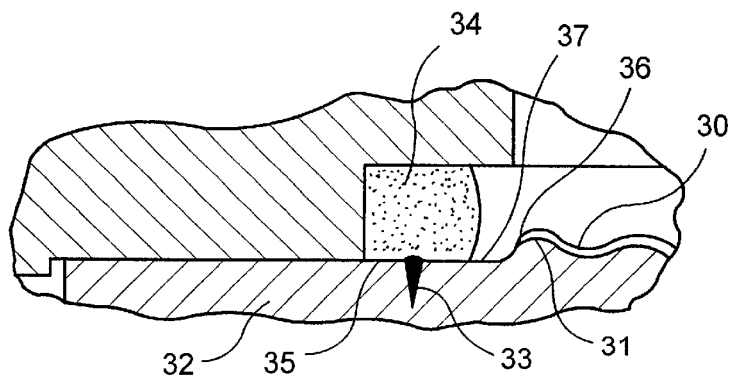
FIG. 3 shows another embodiment of the separating diaphragm system according to the present invention.

FIG. 3 shows a detail corresponding to detail A according to FIGS. 1 and 2. In contrast to the embodiment according to the first two figures, a separating diaphragm 30 is in this case attached to a flat edge 35 of an inner body 32 by an annular welding point 33 outside of an outer, annular, wave-like elevation 31, the attachment being made by welding a flat annular area 37 formed by pre-molding outside of a collar 36 on separating diaphragm 30 to edge 35. A sealing ring 34 is in turn attached in such a way that it covers welding point 33.

When a pressure difference transducer with the described separating diaphragm system is used, a medium which may have corrosive properties is located in the interior spaces of pressure caps 11 and 23. This medium does not come into contact with inner body 1 and 20, respectively, because the latter is tightly sealed off via separating diaphragm 7 and 21, respectively, and sealing ring 13 and 22, respectively. If the static pressure of the medium in pressure caps 11 and 23, respectively, increases, this then results in an expansion of the pressure caps. However, this practically has no effect on the volume stiffness of a separating diaphragm of a pressure difference transducer with the separating diaphragm system described since the fixation diameter of separating diaphragm 7 is defined by its contact with outer, annular, wave-like elevation 4' as a result of the radial initial tensile stress of separating diaphragm 7.

What is claimed is:
1. A method for producing a separating diaphragm system for a pressure transducer, comprising:
providing an inner body having a structured area on an outer surface, the structured area having annular, wave crest-like elevations and annular, wave trough-like depressions, an outside of the structured area being limited by an outer one of the wave crest-like elevations;
providing a separating diaphragm;
pre-molding a collar on an outer circumference of the diaphragm;
fixedly joining the diaphragm to the inner body so as to be gas tight via an annular connection point on the collar of the diaphragm, the collar resting outside on the outer one of the wave crest-like elevations;

after fixedly joining the diaphragm, post-molding the diaphragm so that the diaphragm is corrugated corresponding to the outer surface of the inner body; and after post-molding the diaphragm, pressing an outer pressure cap against the diaphragm to attach the outer pressure cap, a sealing ring being positioned between the pressure cap and the diaphragm.

2. The method according to claim 1, wherein the fixedly joining step includes joining the collar to the inner body at an outer flank of the outer one of the wave crest-like elevations.

3. The method according to claim 1, wherein the fixedly joining step includes joining the collar to the inner body in an area of an elongated flank of the outer one of the wave-like elevations lying below a level of the wave-like depressions.

4. The method according to claim 1, wherein the pre-molding step includes pre-molding the diaphragm so that the diaphragm has at an outer edge a flat annular area adjoining the collar, the flat annular area of the diaphragm being joined to a flat edge of the inner body.

5. The method according to claim 1, further comprising:

arranging the sealing ring so as to cover the connection point between the diaphragm and the inner body.

6. A separating diaphragm system for a pressure transducer, comprising:

an inner body having a structured area on an outer surface, the structured area having annular, wave crest-like elevations and annular, wave trough-like depressions, the structure area being limited to an outside by an outer one of the wave crest-like elevations;

a separating diaphragm having a collar formed by pre-molding an outer circumference of the diaphragm, the diaphragm being fixedly joined to the inner body so as to be gas-tight via an annular connection point on the collar, the collar of the diaphragm being joined on an outside to the outer one of the wave crest-like elevations adjacent to the inner body, the diaphragm having post-molded corrugations corresponding to the outer surface of the inner body; and an outer pressure cap pressed against the diaphragm, a sealing ring being positioned between the outer cap and the diaphragm.

7. The system according to claim 6, wherein an outer flank of the outer one of the wave crest-like elevations is elongated below a level of the wave trough-like depressions, the connection point between the diaphragm and the inner body being located in an elongated area of the outer flank.

8. The system according to claim 6, wherein the separating diaphragm has on an outer edge a flat annular area adjoining the collar, the flat annular area being joined to a flat edge of the inner body.

9. The system according to claim 6, wherein the sealing ring is arranged so as to cover the connection point.

* * * * *